United States Patent
Chen

(10) Patent No.: US 9,239,445 B2
(45) Date of Patent: Jan. 19, 2016

(54) MINIATURIZED LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Yuan-Chen Chen, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (BV)

( * ) Notice: Subject to any disclaimer, the term of this patent is extended or adjusted under 35 U.S.C. 154(b) by 0 days.

(21) Appl. No.: 14/253,894

(22) Filed: Apr. 16, 2014

(65) Prior Publication Data
US 2014/0327976 A1    Nov. 6, 2014

(30) Foreign Application Priority Data
May 3, 2013    (TW) .............................. 102115850 A

(51) Int. Cl.
*G02B 3/02*    (2006.01)
*G02B 13/00*    (2006.01)

(52) U.S. Cl.
CPC .................. *G02B 13/0035* (2013.01)

(58) Field of Classification Search
CPC .................................................. G02B 13/0035
USPC ............................................................ 359/716
See application file for complete search history.

(56) References Cited

U.S. PATENT DOCUMENTS

2013/0050849 A1*    2/2013    Hsu et al. .................... 359/716

FOREIGN PATENT DOCUMENTS

JP        2005258467        9/2005

OTHER PUBLICATIONS

English Abstract translation of JP2005258467 (Published Sep. 22, 2005).

* cited by examiner

*Primary Examiner* — James Jones
(74) *Attorney, Agent, or Firm* — McClure, Qualey & Rodack, LLP

(57) ABSTRACT

A miniaturized lens assembly includes a first lens, a second lens and a third lens, all of which are arranged in sequence from an object side to an image side along an optical axis. The first lens is a convex-concave lens with negative refractive power and includes a convex surface facing the object side and a concave surface facing the image side. The second lens is with positive refractive power. The third lens is a convex-concave lens with negative refractive power and includes a convex surface facing the object side and a concave surface facing the image side.

10 Claims, 18 Drawing Sheets

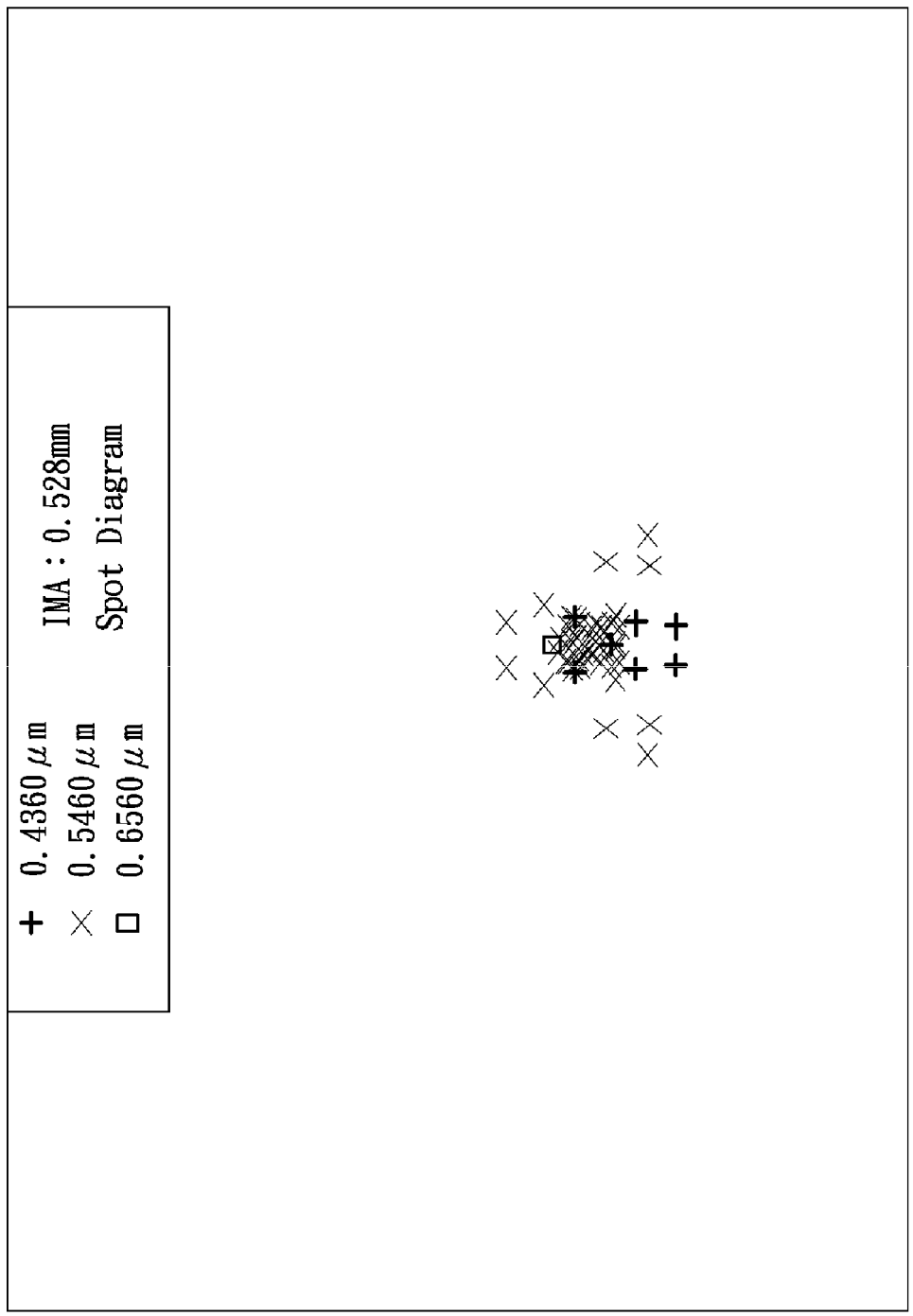

MINIATURIZED LENS ASSEMBLY

BACKGROUND OF THE INVENTION

1. Field of the Invention

The invention relates to a lens assembly, and more particularly to a miniaturized lens assembly.

2. Description of the Related Art

The first lens of a known lens assembly which is structured by 3 lenses is generally with positive refractive power. Therefore, the field of view is restricted and the application field is affected for such a lens assembly.

BRIEF SUMMARY OF THE INVENTION

The invention provides a miniaturized lens assembly to solve the above problems. The miniaturized lens assembly of the invention, provided with characteristics of a larger field of view and miniaturization, still has a good optical performance, can meet a requirement of resolution, and can be mass-produced.

The miniaturized lens assembly in accordance with an exemplary embodiment of the invention includes a first lens, a second lens and a third lens, all of which are arranged in sequence from an object side to an image side along an optical axis. The first lens is a convex-concave lens with negative refractive power and includes a convex surface facing the object side and a concave surface facing the image side. The second lens is with positive refractive power. The third lens is a convex-concave lens with negative refractive power and includes a convex surface facing the object side and a concave surface facing the image side.

In another exemplary embodiment, the miniaturized lens assembly satisfies: $0.35 \leq BFL/TTL \leq 0.38$ wherein BFL is a back focal length of the miniaturized lens assembly and TTL is a distance from the convex surface of the first lens to an image plane along the optical axis.

In yet another exemplary embodiment, the first lens satisfies: $-4.5 \leq f_1/f \leq -3.3$ wherein $f_1$ is an effective focal length of the first lens and f is an effective focal length of the miniaturized lens assembly.

In another exemplary embodiment, the second lens satisfies: $0.5 \leq f_2/f \leq 0.55$ wherein $f_2$ is an effective focal length of the second lens and f is an effective focal length of the miniaturized lens assembly.

In yet another exemplary embodiment, the third lens satisfies: $-0.9 \leq f_3/f \leq -0.8$ wherein $f_3$ is an effective focal length of the third lens and f is an effective focal length of the miniaturized lens assembly.

In another exemplary embodiment, the first lens and the third lens satisfy: $3.75 \leq f_1/f_3 \leq 5.5$ wherein $f_1$ is an effective focal length of the first lens and $f_3$ is an effective focal length of the third lens.

In yet another exemplary embodiment, the convex surface of the first lens is an aspheric surface, or the concave surface of the first lens is an aspheric surface, or both of the convex surface and the concave surface of the first lens are aspheric surfaces.

In another exemplary embodiment, the second lens includes two surfaces, at least one of which is an aspheric surface or both of which are aspheric surfaces.

In yet another exemplary embodiment, the convex surface of the third lens is an aspheric surface, or the concave surface of the third lens is an aspheric surface, or both of the convex surface and the concave surface of the third lens are aspheric surfaces.

In another exemplary embodiment, the first lens, the second lens and the third lens are made of plastic material.

In yet another exemplary embodiment, the miniaturized lens assembly further includes a stop disposed between the first lens and the second lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 2F-2H are spot diagrams of the miniaturized lens assembly in accordance with the first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
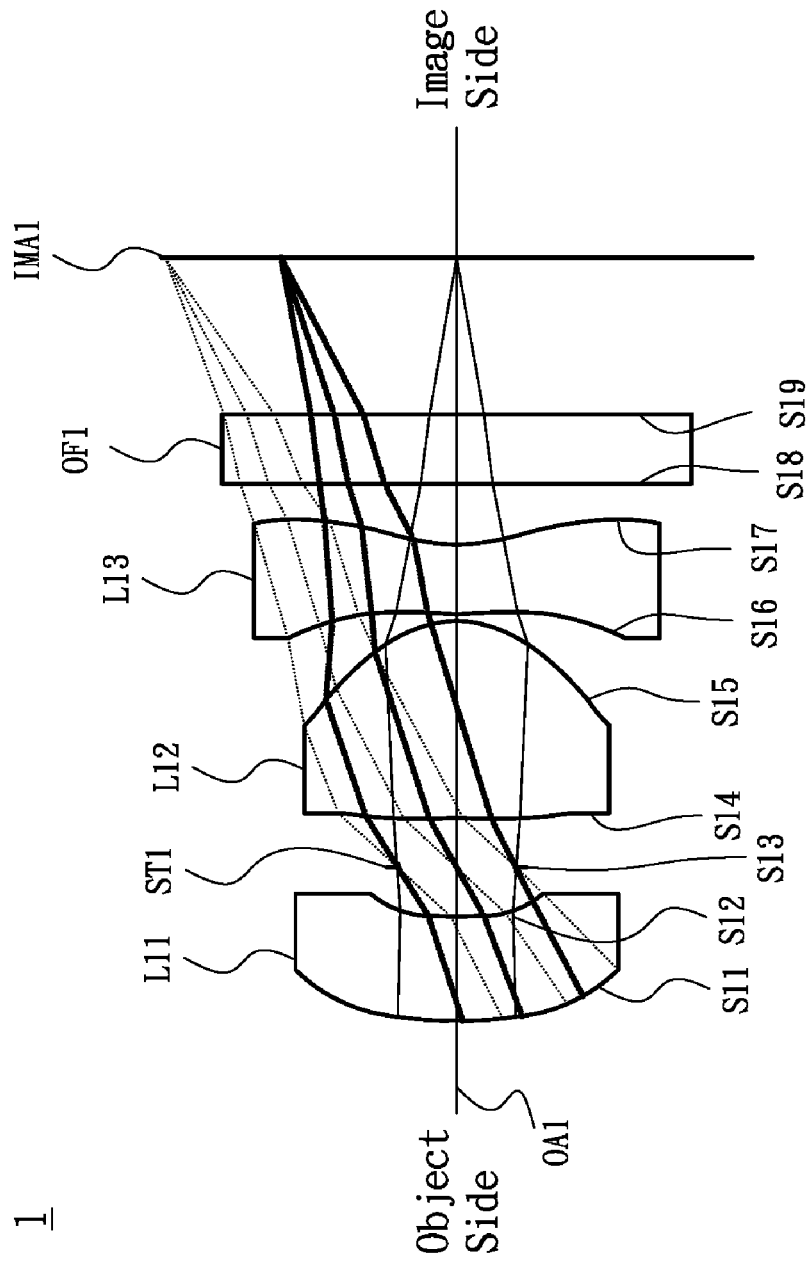
FIG. 1 is a lens layout and optical path diagram of a miniaturized lens assembly in accordance with a first embodiment of the invention.

Referring to FIG. 1, FIG. 1 is a lens layout and optical path diagram of a miniaturized lens assembly in accordance with a first embodiment of the invention. The miniaturized lens assembly 1 includes a first lens L11, a stop ST1, a second lens L12, a third lens L13 and an Optical filter OF1, all of which are arranged in sequence from an object side to an image side along an optical axis OA1. The first lens L11 is made of plastic material and with negative refractive power, wherein the object side surface S11 is a convex surface, the image side surface S12 is a concave surface and both of the object side surface S11 and image side surface S12 are aspheric surfaces. The second lens L12 is made of plastic material and with positive refractive power, wherein the object side surface S14 is a convex surface, the image side surface S15 is a convex surface and both of the object side surface S14 and image side surface S15 are aspheric surfaces. The third lens L13 is made of plastic material and with negative refractive power, wherein the object side surface S16 is a convex surface, the image side surface S17 is a concave surface and both of the object side surface S16 and image side surface S17 are aspheric surfaces. The optical filter OF1 is a glass plate, wherein both of the object side surface S18 and image side surface S19 are plane surfaces.

In order to maintain excellent optical performance of the miniaturized lens assembly in accordance with the first embodiment of the invention, the miniaturized lens assembly 1 must satisfies the following five conditions:

$$0.35 \leq BFL1/TTL1 \leq 0.38 \quad (1)$$

$$-4.5 \leq fl_1/fl \leq -3.3 \quad (2)$$

$$0.5 \leq fl_2/fl \leq 0.55 \quad (3)$$

$$-0.9 \leq fl_3/fl \leq -0.8 \quad (4)$$

$$3.75 \leq fl_1/fl_3 \leq 5.5 \quad (5)$$

wherein BFL1 is a back focal length of the miniaturized lens assembly 1, TTL1 is a distance between the object side surface S11 of the first lens L11 to an image plane IMA1 along the optical axis OA1, fl is an effective focal length of the miniaturized lens assembly 1, $fl_1$ is an effective focal length of the first lens L11, $fl_2$ is an effective focal length of the second lens L12, and $fl_3$ is an effective focal length of the third lens L13.

By the above design of the lenses and stop ST1, the miniaturized lens assembly 1 is provided with a shortened total lens length, an increased field of view, an effective corrected aberration, and an increased resolution.

In order to achieve the above purposes and effectively enhance the optical performance, the miniaturized lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens.

TABLE 1

Effective Focal Length = 1.009 mm
F-number = 2.8
Field of View = 82.74°
Total Lens Length = 2.301 mm

| Surface Number | Radius of Curvature (mm) | Thickness (mm) | Nd | Vd | Remark |
|---|---|---|---|---|---|
| S11 | 2.001384 | 0.3104379 | 1.544100 | 56.093602 | The First Lens L11 |
| S12 | 0.9164613 | 0.1491604 | | | |
| S13 | ∞ | 0.1488161 | | | Stop ST1 |
| S14 | 4.724831 | 0.5977276 | 1.544100 | 56.093602 | The Second Lens L12 |
| S15 | −0.3013802 | 0.02 | | | |
| S16 | 2.036033 | 0.2087408 | 1.635505 | 23.901341 | The Third Lens L13 |
| S17 | 0.4345197 | 0.1821043 | | | |
| S18 | ∞ | 0.21 | 1.516800 | 64.167336 | Optical Filter OF1 |
| S19 | ∞ | 0.474345 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S11 | 0 | 1.7430111 | −3.7563879 | 22.38742 | −63.298345 | 140.76326 | 0 | 0 |
| S12 | 4.257051 | 4.3319866 | 48.191083 | −1899.6258 | 34849.266 | −188733 | 0 | 0 |
| S14 | 92.74051 | 0.12024885 | −21.657916 | 194.00814 | 1366.9568 | −22928.167 | 105167.24 | −171006.06 |
| S15 | −0.8460762 | 3.3336179 | −16.841394 | −1.6531002 | 364.05278 | −385.02725 | −8199.4017 | 30435.328 |
| S16 | −227.3514 | −1.9842101 | 1.6196759 | −9.2742967 | −7.1907044 | 567.55633 | −2010.0729 | 2046.9593 |
| S17 | −8.121758 | −1.623142 | 4.2355327 | −8.2736782 | 7.7231138 | 11.533422 | −36.905873 | 23.601817 |

For the miniaturized lens assembly 1 of the first embodiment, the back focal length BFL1 of the miniaturized lens assembly 1 is equal to 0.866 mm, the distance TTL1 between the object side surface S11 of the first lens L11 to the image plane IMA1 along the optical axis OA1 is equal to 2.301 mm, the effective focal length f1 of the miniaturized lens assembly 1 is equal to 1.009 mm, the effective focal length $f1_1$ of the first lens L11 is equal to −3.442 mm, the effective focal length $f1_2$ of the second lens L12 is equal to 0.541 mm, and the effective focal length $f1_3$ of the third lens L13 is equal to −0.907 mm. According to the above data, the following values can be obtained:

BFL1/TTL1=0.3764, $f1_1/f1$=−3.4113, $f1_2/f1$=0.5362, $f1_3/f1$=−0.8989, $f1_1/f1_3$=3.7949 which respectively satisfy the above conditions (1)-(5).

Figure 2A:
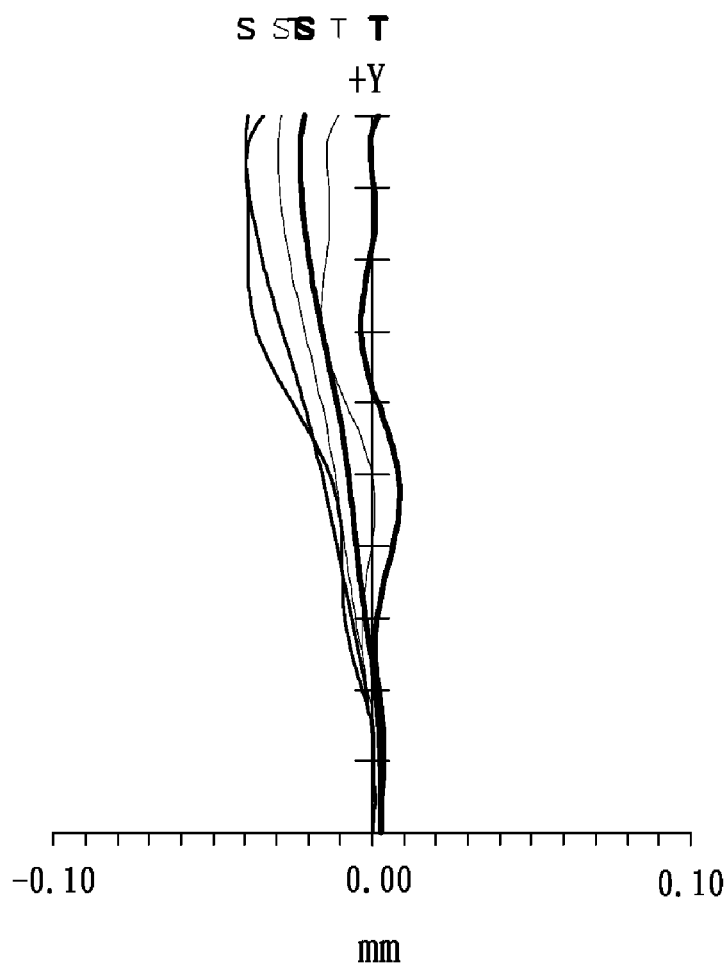
FIG. 2A is a field curvature diagram of the miniaturized lens assembly in accordance with the first embodiment of the invention.
Figure 2B:
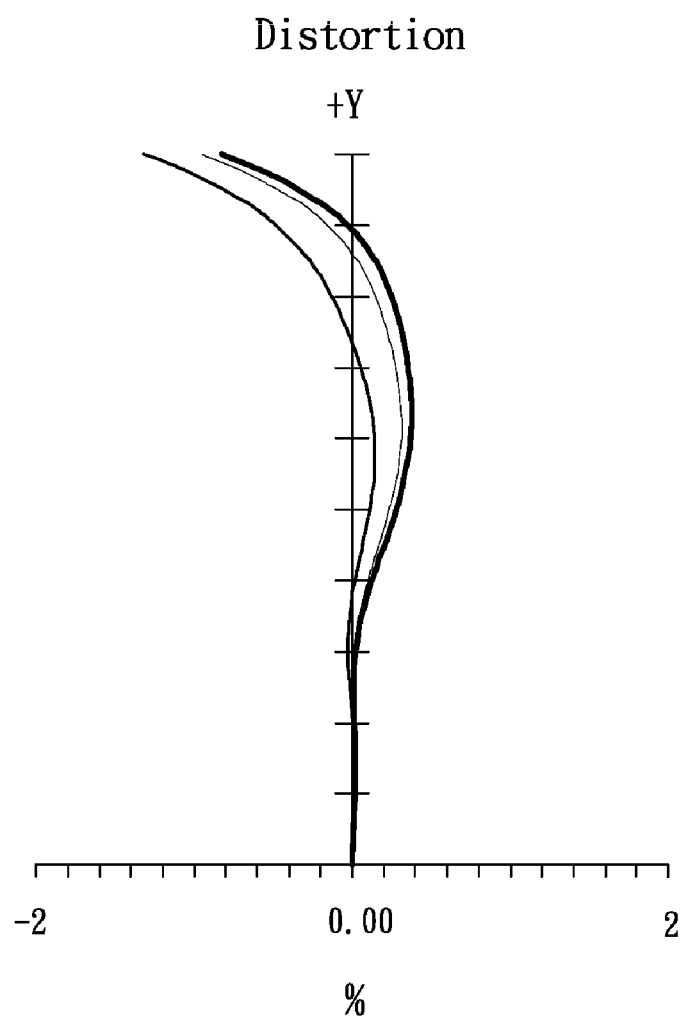
FIG. 2B is a distortion diagram of the miniaturized lens assembly in accordance with the first embodiment of the invention.
Figure 2C:
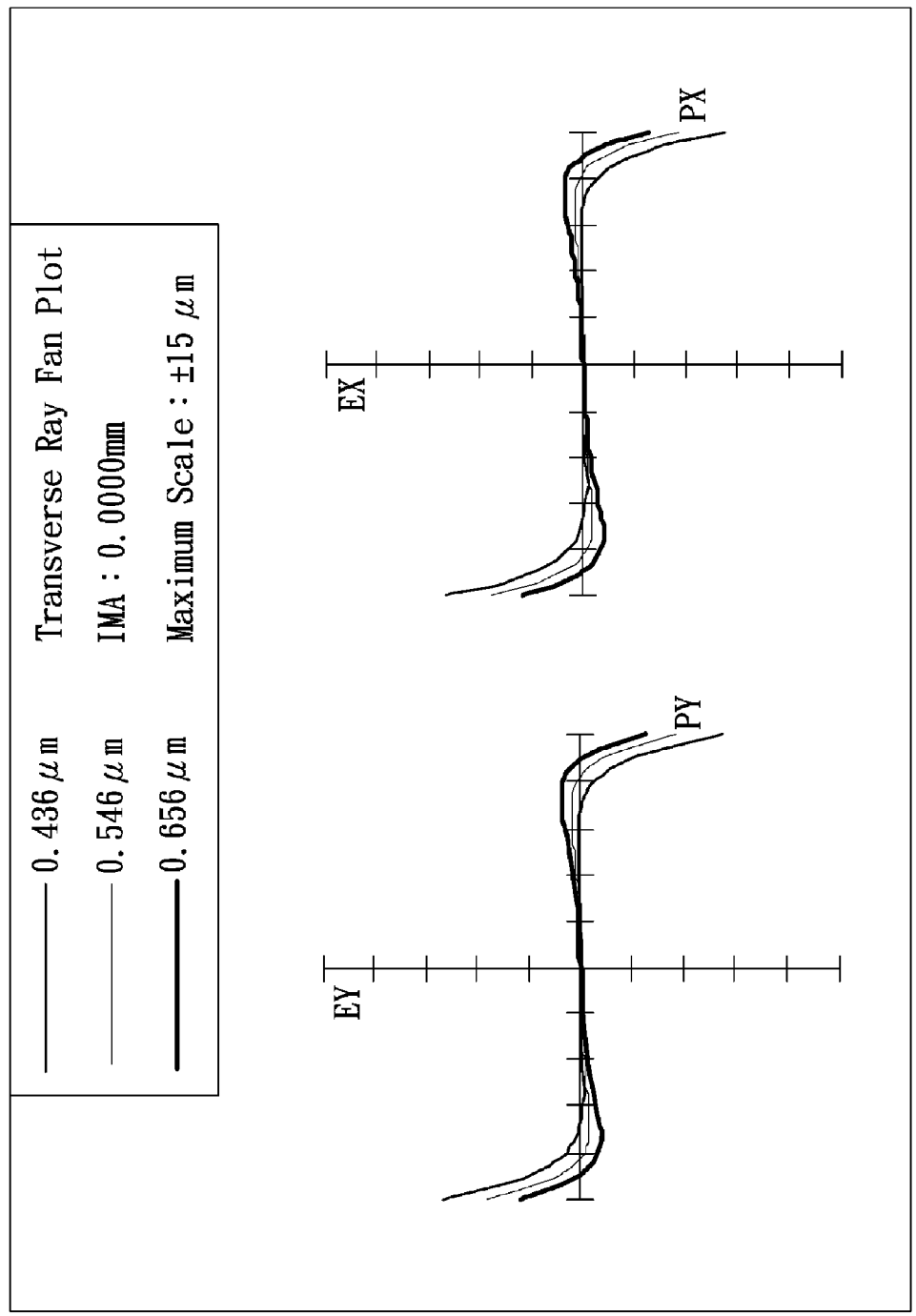
FIGS. 2C-2E are transverse ray fan diagrams of the miniaturized lens assembly in accordance with the first embodiment of the invention.
Figure 2D:
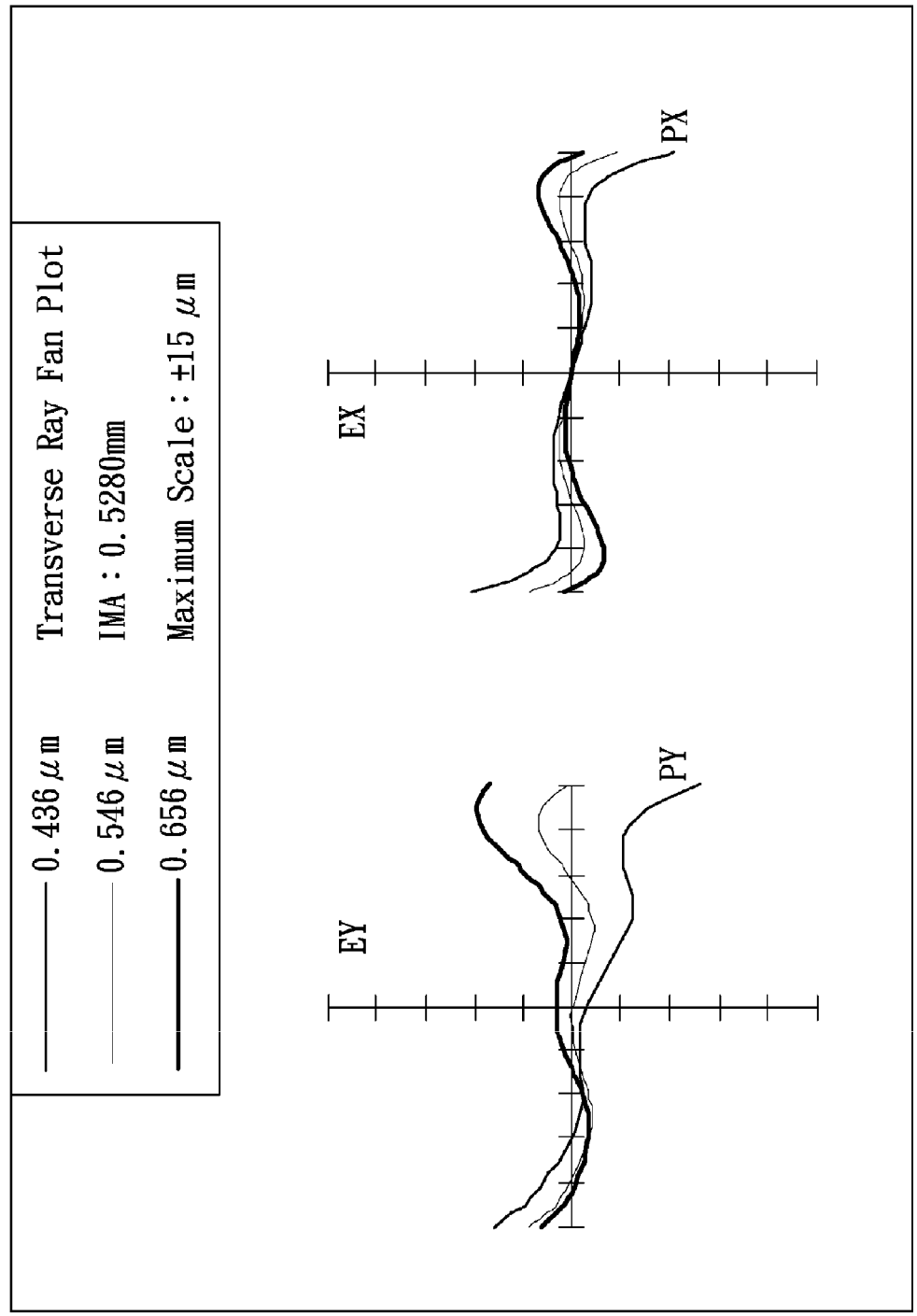
Figure 2E:
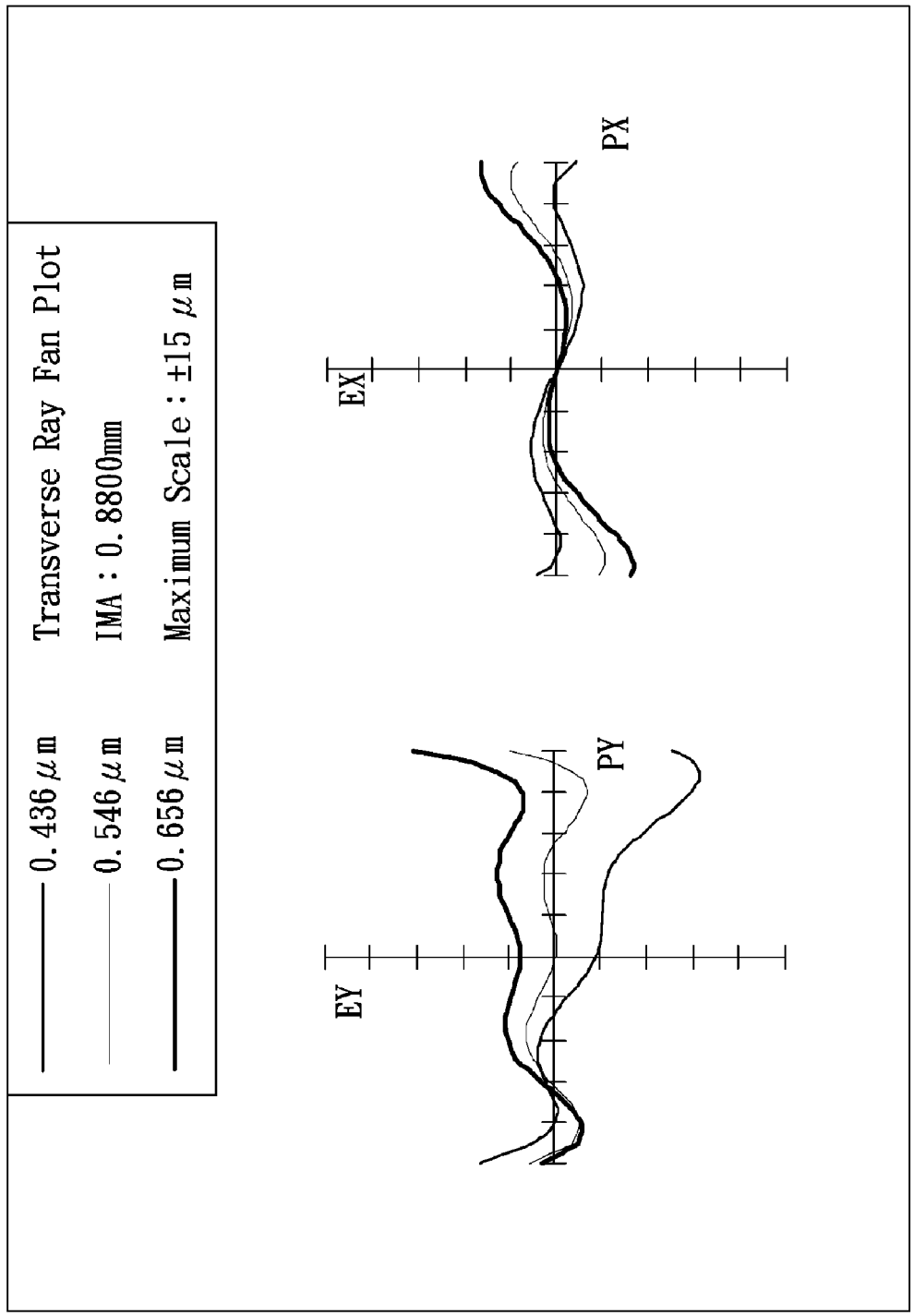
Figure 2F:
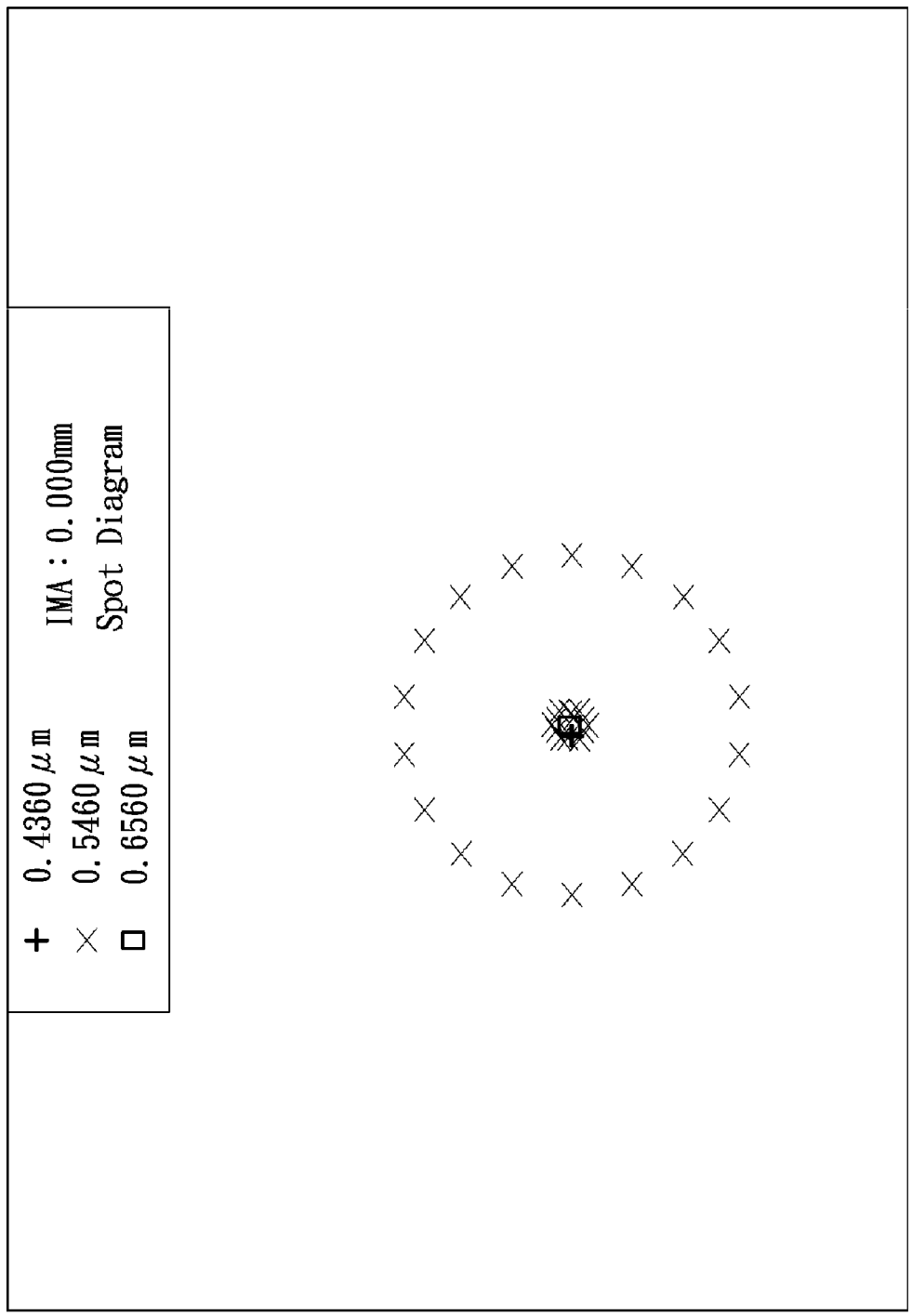
Figure 2H:
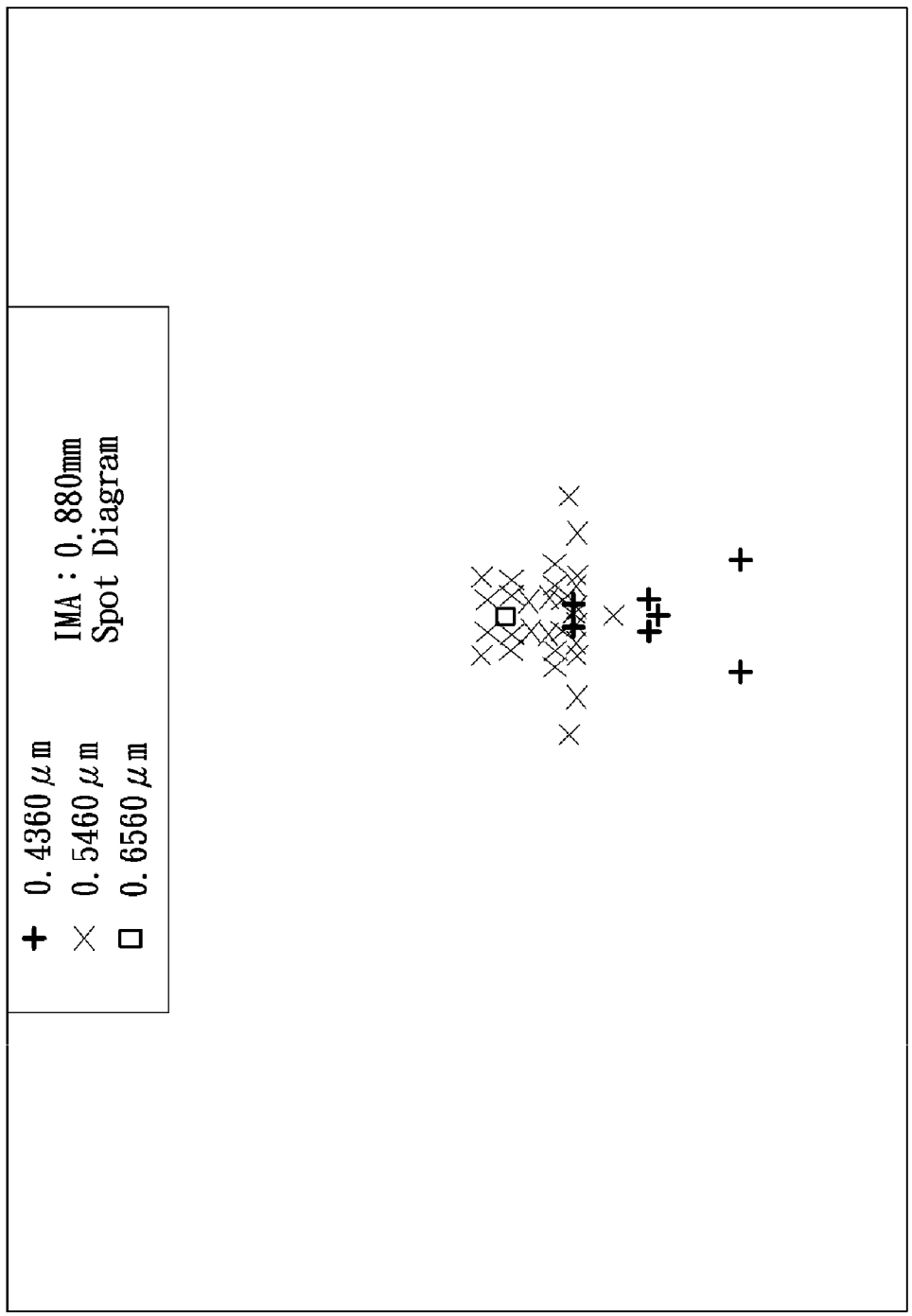

By the above arrangements of the lenses and stop ST1, the miniaturized lens assembly 1 of the first embodiment can meet the requirements of optical performance as seen in FIGS. 2A-2H, wherein FIG. 2A shows a field curvature diagram of the miniaturized lens assembly 1 in accordance with the first embodiment of the invention, FIG. 2B shows a distortion diagram of the miniaturized lens assembly 1 in accordance with the first embodiment of the invention, FIGS. 2C-2E show transverse ray fan diagrams of the miniaturized lens assembly 1 in accordance with the first embodiment of the invention and FIGS. 2F-2H show spot diagrams of the miniaturized lens assembly 1 in accordance with the first embodiment of the invention.

It can be seen from FIG. 2A that the field curvature of tangential direction and sagittal direction in the miniaturized lens assembly 1 of the first embodiment ranges between −0.04 mm and 0.01 mm for the wavelength of 0.436 μm, 0.546 μm and 0.656 μm. It can be seen from FIG. 2B that the distortion in the miniaturized lens assembly 1 of the first embodiment ranges between −1.3% and 0.4% for the wavelength of 0.436 μm, 0.546 μm and 0.656 μm. It can be seen from FIGS. 2C-2E that the transverse ray aberration in the miniaturized lens assembly 1 of the first embodiment ranges between −12.0 μm and 10.0 μm wherein the wavelength is 0.436 μm, 0.546 μm and 0.656 μm, each field is 0.0000 mm, 0.5280 mm and 0.8800 mm. It can be seen from FIGS. 2F-2H that the root mean square spot radius is equal to 3.459 μm, 1.718 μm, 2.198 μm and geometrical spot radius is equal to 5.451 μm, 3.924 μm, 5.892 μm for the field of 0.000 mm, 0.528 mm and 0.880 mm, and wavelength of 0.436 μm, 0.546 μm and 0.656 μm in the miniaturized lens assembly 1 of the first embodiment. It is obvious that the field curvature, the distortion and the transverse ray aberration of the miniaturized lens assembly 1 of the first embodiment can be corrected effectively. Therefore, the miniaturized lens assembly 1 of the first embodiment is capable of good optical performance.

Figure 3:
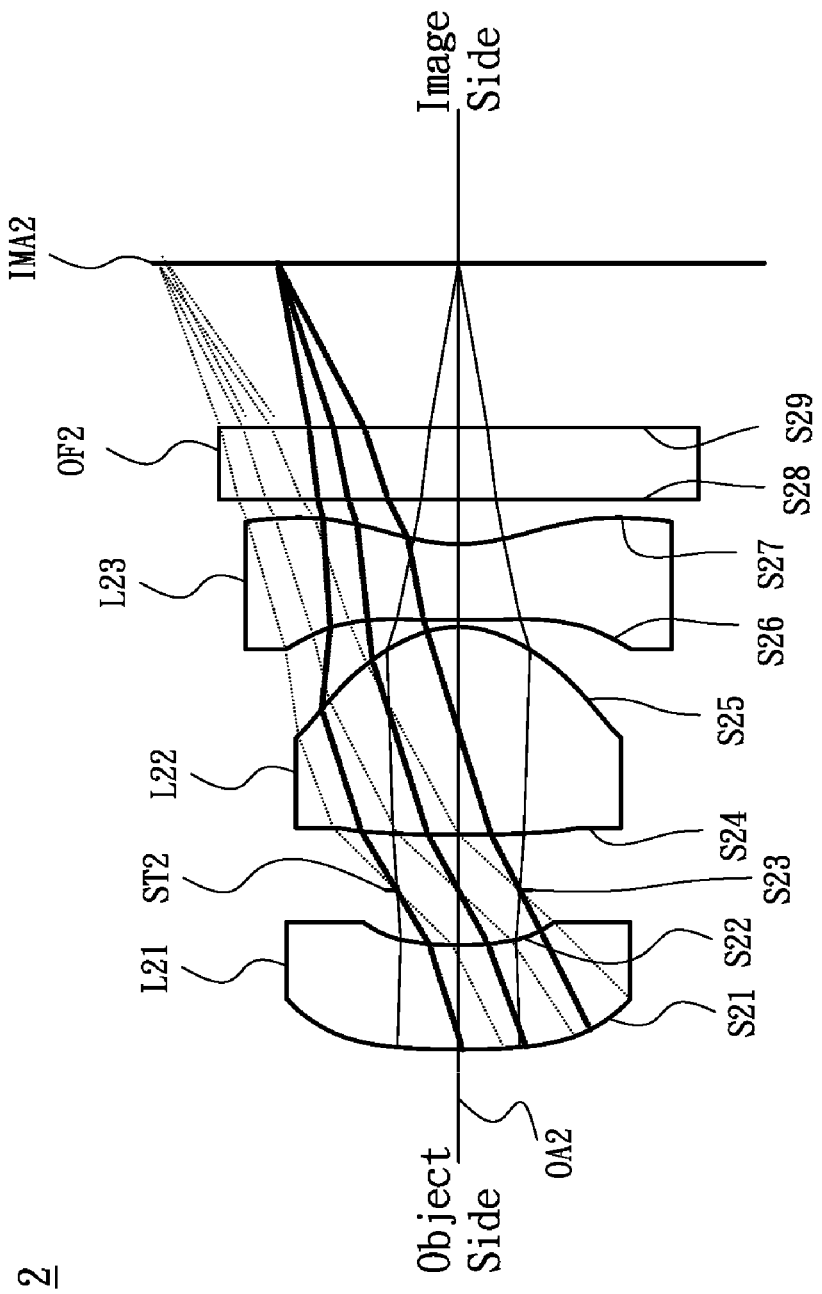
FIG. 3 is a lens layout and optical path diagram of a miniaturized lens assembly in accordance with a second embodiment of the invention.

Referring to FIG. 3, FIG. 3 is a lens layout and optical path diagram of a miniaturized lens assembly in accordance with a second embodiment of the invention. The miniaturized lens assembly 2 includes a first lens L21, a stop ST2, a second lens L22, a third lens L23 and an Optical filter OF2, all of which are arranged in sequence from an object side to an image side along an optical axis OA2. The first lens L21 is made of plastic material and with negative refractive power, wherein the object side surface S21 is a convex surface, the image side surface S22 is a concave surface and both of the object side surface S21 and image side surface S22 are aspheric surfaces. The second lens L22 is made of plastic material and with positive refractive power, wherein the object side surface S24 is a convex surface, the image side surface S25 is a convex surface and both of the object side surface S24 and image side surface S25 are aspheric surfaces. The third lens L23 is made of plastic material and with negative refractive power, wherein the object side surface S26 is a convex surface, the image side surface S27 is a concave surface and both of the object side surface S26 and image side surface S27 are aspheric surfaces. The optical filter OF2 is a glass plate, wherein both of the object side surface S28 and image side surface S29 are plane surfaces.

In order to maintain excellent optical performance of the miniaturized lens assembly in accordance with the second embodiment of the invention, the miniaturized lens assembly 2 must satisfies the following five conditions:

$$0.35 \leq BFL2/TTL2 \leq 0.38 \quad (6)$$

$$-4.5 \leq f2_1/f2 \leq -3.3 \quad (7)$$

$$0.5 \leq f2_2/f2 \leq 0.55 \quad (8)$$

$$-0.9 \leq f2_3/f2 \leq -0.8 \quad (9)$$

$$3.75 \leq f2_1/f2_3 \leq 5.5 \quad (10)$$

wherein BFL2 is a back focal length of the miniaturized lens assembly 2, TTL2 is a distance between the object side surface S21 of the first lens L21 to an image plane IMA2 along the optical axis OA2, f2 is an effective focal length of the miniaturized lens assembly 2, $f2_1$ is an effective focal length of the first lens L21, $f2_2$ is an effective focal length of the second lens L22 and $f2_3$ is an effective focal length of the third lens L23.

By the above design of the lenses and stop ST2, the miniaturized lens assembly 2 is provided with a shortened total lens length, an increased field of view, an effective corrected aberration, and an increased resolution.

In order to achieve the above purposes and effectively enhance the optical performance, the miniaturized lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens.

TABLE 3

Effective Focal Length = 1.007 mm
F-number = 2.8
Field of View = 82.75°
Total Lens Length = 2.303 mm

| Surface Number | Radius of Curvature (mm) | Thickness (mm) | Nd | Vd | Remark |
|---|---|---|---|---|---|
| S21 | 2.762649 | 0.3081297 | 1.544100 | 56.093602 | The First Lens L21 |
| S22 | 1.230835 | 0.1580928 | | | |
| S23 | ∞ | 0.1637645 | | | Stop ST2 |
| S24 | 3.906848 | 0.6088281 | 1.544100 | 56.093602 | The Second Lens L22 |
| S25 | −0.2984624 | 0.02 | | | |
| S26 | 2.704055 | 0.2220229 | 1.635505 | 23.901341 | The Third Lens L23 |

TABLE 3-continued

Effective Focal Length = 1.007 mm
F-number = 2.8
Field of View = 82.75°
Total Lens Length = 2.303 mm

| Surface Number | Radius of Curvature (mm) | Thickness (mm) | Nd | Vd | Remark |
|---|---|---|---|---|---|
| S27 | 0.4256271 | 0.1321043 | | | |
| S28 | ∞ | 0.21 | 1.516800 | 64.167336 | Optical Filter OF2 |
| S29 | ∞ | 0.4787061 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C | D | E | F | G |
|---|---|---|---|---|---|---|---|---|
| S21 | 0 | 1.7561355 | −4.7483345 | 28.70249 | −87.058066 | 156.3113 | 0 | 0 |
| S22 | −2.691988 | 4.9768916 | 12.253923 | −565.16492 | 11422.626 | −55088.931 | 0 | 0 |
| S24 | 79.55649 | 0.49135067 | −29.609457 | 270.28075 | 386.65537 | −16810.02 | 93089.076 | −179658.33 |
| S25 | −0.8902057 | 5.27478 | −47.780443 | 219.54188 | −223.85741 | −2232.5315 | 7820.2745 | −1922.6312 |
| S26 | −235.3527 | −1.0821187 | −12.599217 | 60.170011 | −99.428194 | 87.242637 | 118.88525 | −513.98394 |
| S27 | −7.103345 | −1.6647726 | 3.3803867 | −5.9186668 | 14.089898 | −29.840437 | 38.83636 | −24.937521 |

For the miniaturized lens assembly 2 of the second embodiment, the back focal length BFL2 of the miniaturized lens assembly 2 is equal to 0.822 mm, the distance TTL2 between the object side surface S21 of the first lens L21 to the image plane IMA2 along the optical axis OA2 is equal to 2.303 mm, the effective focal length f2 of the miniaturized lens assembly 2 is equal to 1.007 mm, the effective focal length $f2_1$ of the first lens L21 is equal to −4.373 mm, the effective focal length $f2_2$ of the second lens L22 is equal to 0.535 mm, and the effective focal length $f2_3$ of the third lens L23 is equal to −0.818 mm. According to the above data, the following values can be obtained:

BFL2/TTL2=0.3569, $f2_1/f2$=−4.3426, $f2_2/f2$=0.5313, $f2_3/f2$=−0.8123, $f2_1/f2_3$=5.3460 which respectively satisfy the above conditions (6)-(10).

Figure 4A:
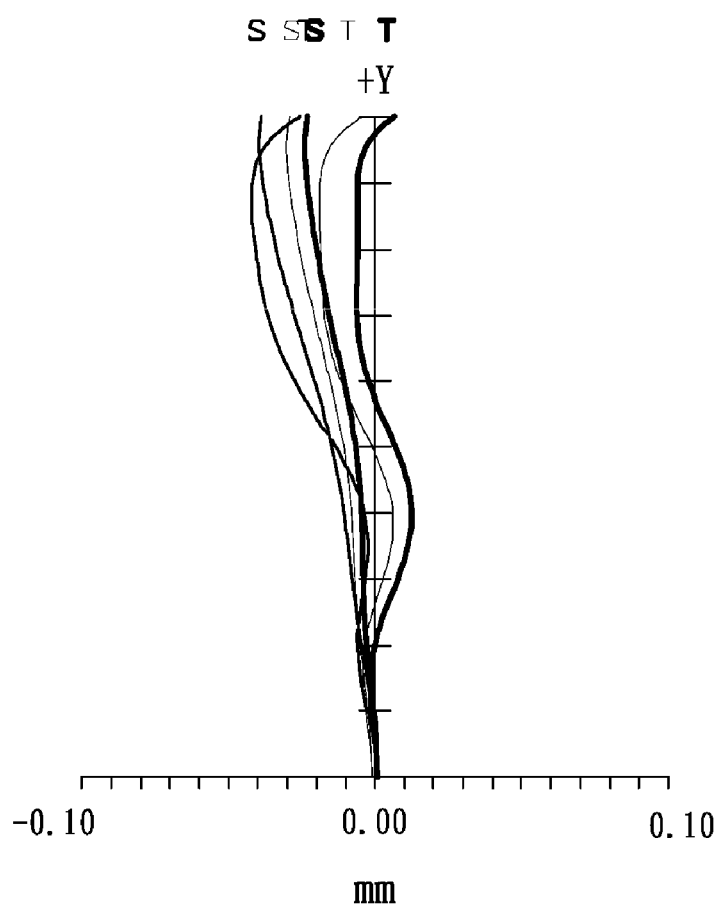
FIG. 4A is a field curvature diagram of the miniaturized lens assembly in accordance with the second embodiment of the invention.
Figure 4B:
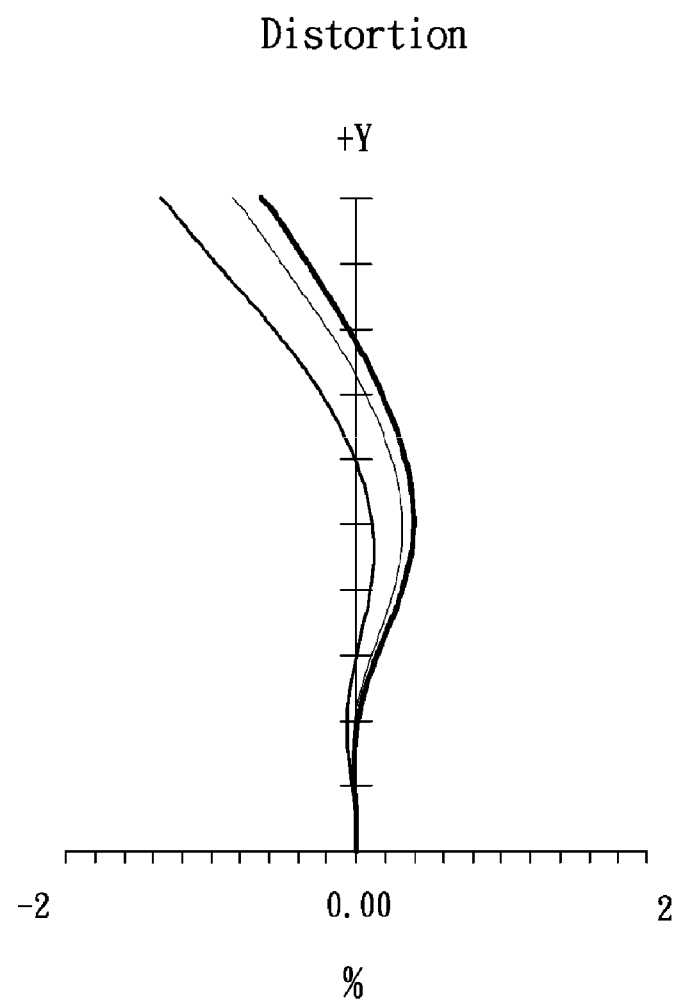
FIG. 4B is a distortion diagram of the miniaturized lens assembly in accordance with the second embodiment of the invention.
Figure 4C:
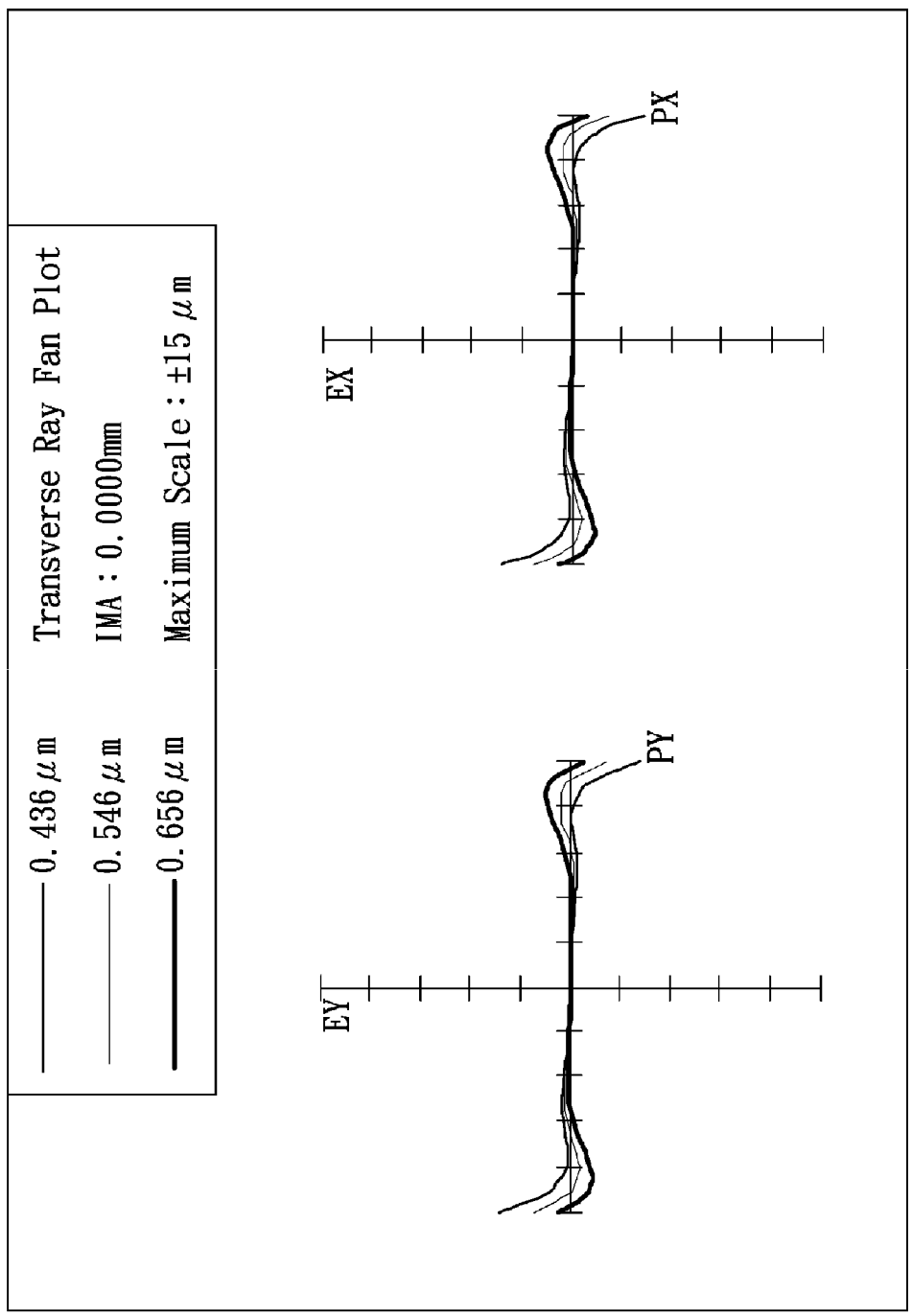
FIGS. 4C-4E are transverse ray fan diagrams of the miniaturized lens assembly in accordance with the second embodiment of the invention.
Figure 4D:
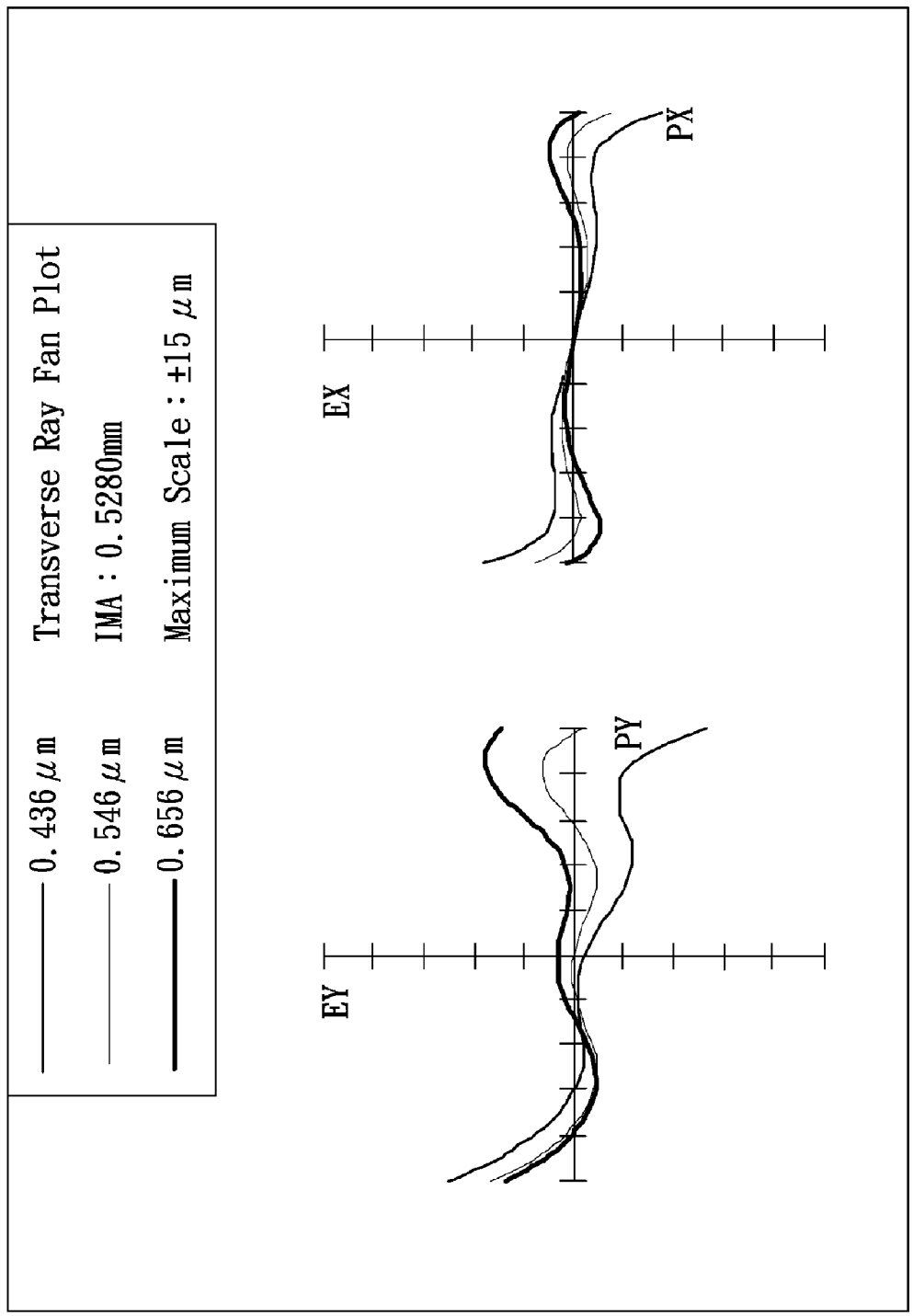
Figure 4E:
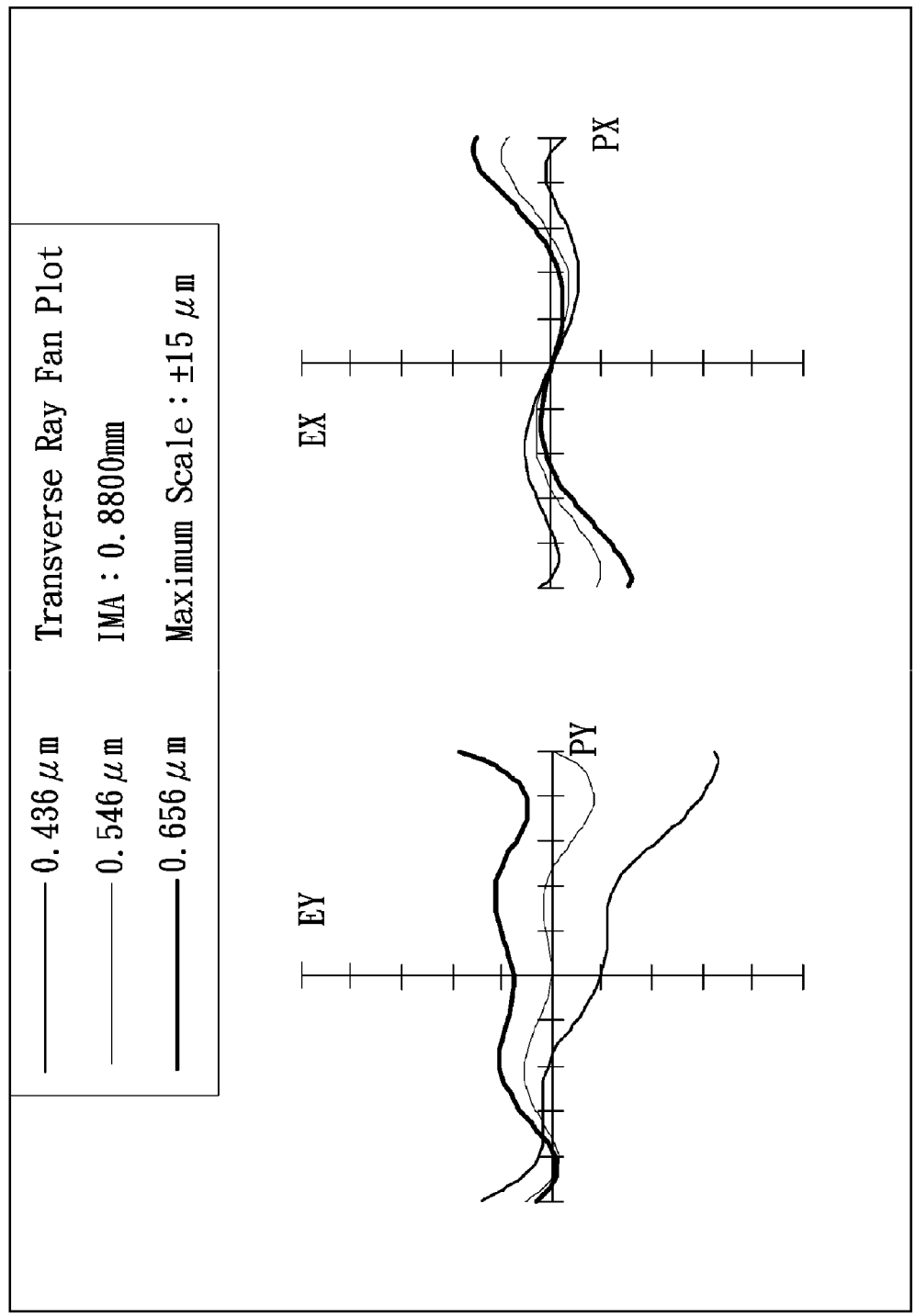
Figure 4F:
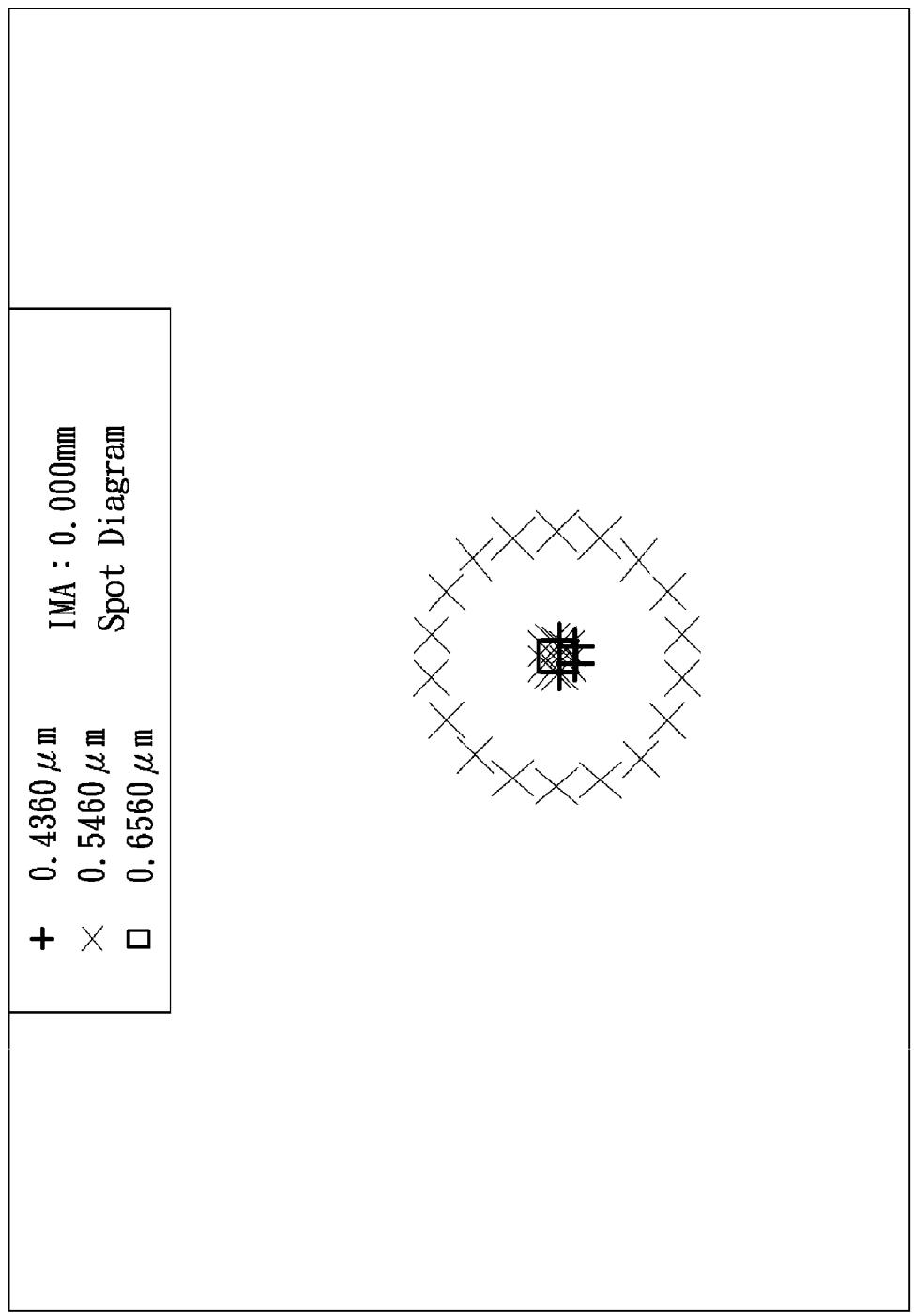
FIGS. 4F-4H are spot diagrams of the miniaturized lens assembly in accordance with the second embodiment of the invention.
Figure 4G:
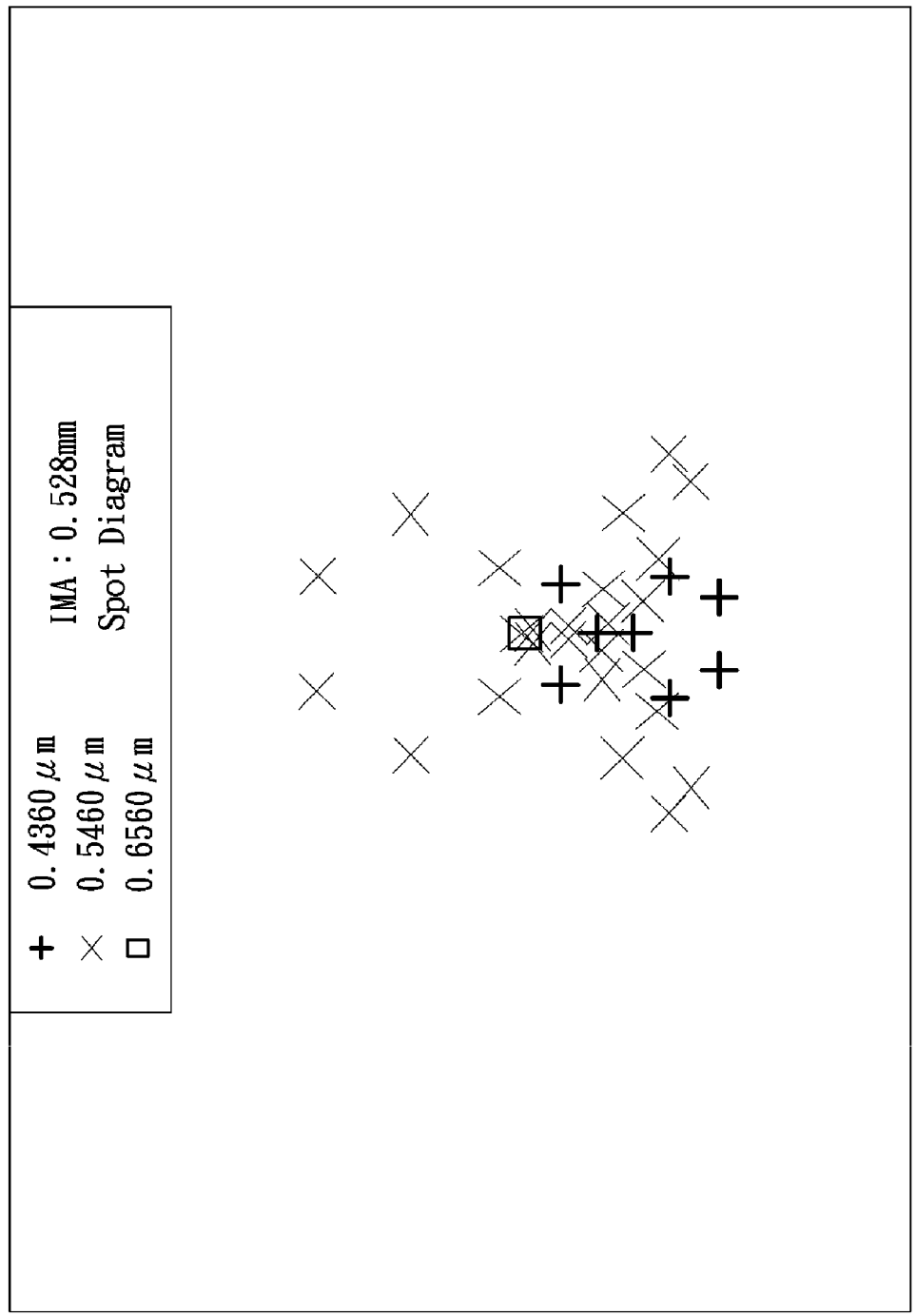
Figure 4H:
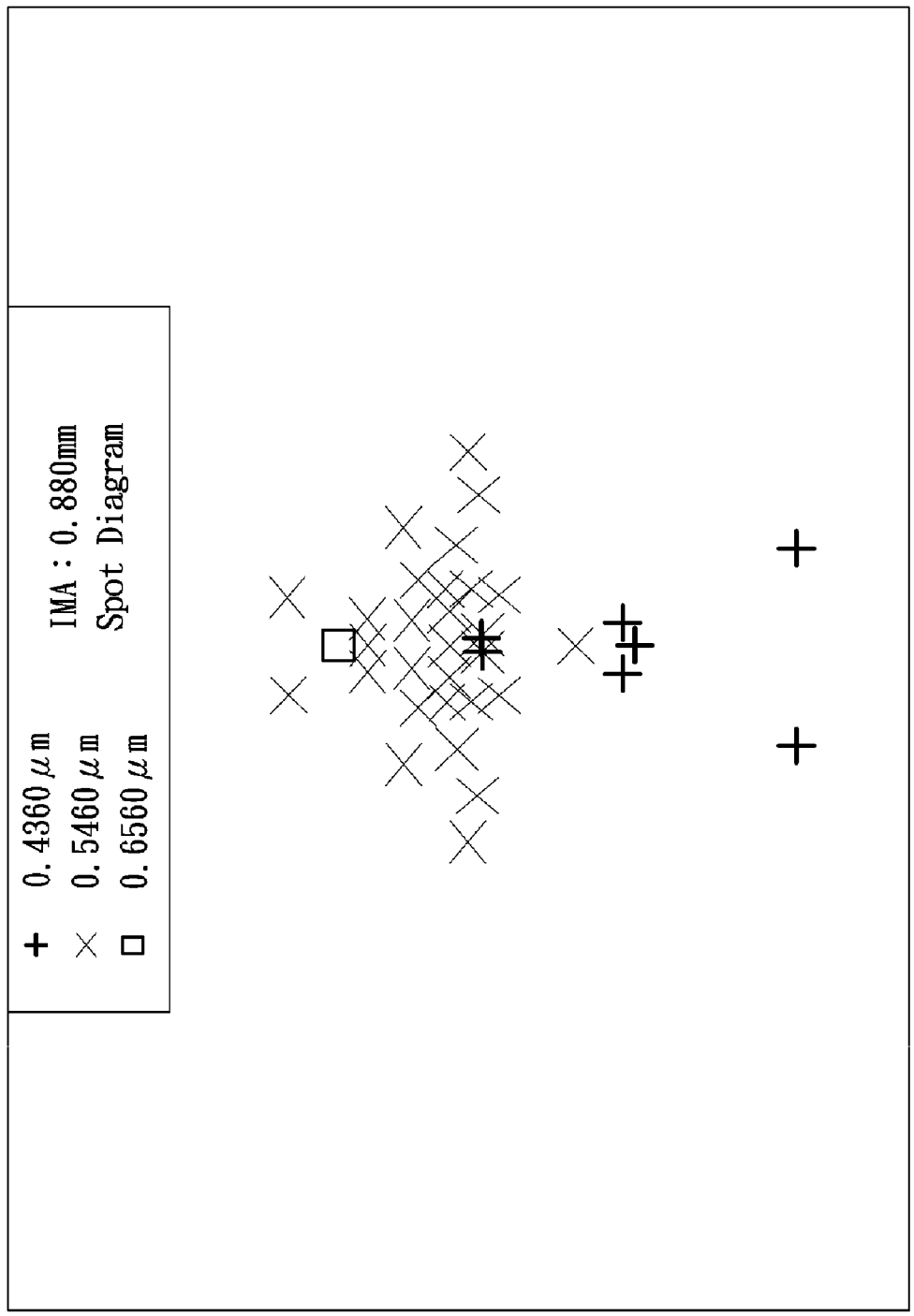

By the above arrangements of the lenses and stop ST2, the miniaturized lens assembly 2 of the second embodiment can meet the requirements of optical performance as seen in FIGS. 4A-4H, wherein FIG. 4A shows a field curvature diagram of the miniaturized lens assembly 2 in accordance with the second embodiment of the invention, FIG. 4B shows a distortion diagram of the miniaturized lens assembly 2 in accordance with the second embodiment of the invention, FIGS. 4C-4E show transverse ray fan diagrams of the miniaturized lens assembly 2 in accordance with the second embodiment of the invention and FIGS. 4F-4H show spot diagrams of the miniaturized lens assembly 2 in accordance with the second embodiment of the invention.

It can be seen from FIG. 4A that the field curvature of tangential direction and sagittal direction in the miniaturized lens assembly 2 of the second embodiment ranges between −0.05 mm and 0.02 mm for the wavelength of 0.436 μm, 0.546 μm and 0.656 μm. It can be seen from FIG. 4B that the distortion in the miniaturized lens assembly 2 of the second embodiment ranges between −1.4% and 0.4% for the wavelength of 0.436 μm, 0.546 μm and 0.656 μm. It can be seen from FIGS. 4C-4E that the transverse ray aberration in the miniaturized lens assembly 2 of the second embodiment ranges between −10.0 μm and 9.0 μm wherein the wavelength is 0.436 μm, 0.546 μm and 0.656 μm, each field is 0.0000 mm, 0.5280 mm and 0.8800 mm. It can be seen from FIGS. 4F-4H that the root mean square spot radius is equal to 1.441 μm, 2.027 μm, 2.208 μm and geometrical spot radius is equal to 2.268 μm, 4.914 μm, 6.108 μm for the field of 0.000 mm, 0.528 mm and 0.880 mm, and wavelength of 0.436 μm, 0.546 μm and 0.656 μm in the miniaturized lens assembly 2 of the second embodiment. It is obvious that the field curvature, the distortion and the transverse ray aberration of the miniaturized lens assembly 2 of the second embodiment can be corrected effectively. Therefore, the miniaturized lens assembly 2 of the second embodiment is capable of good optical performance.

In the above embodiments, the object side surface and image side surface of the first, second and third lens are aspheric surfaces. However, it has the same effect and falls into the scope of the invention that a partial or all of the object side surface or image side surface of the first, second and third lens are changed into spherical surfaces.

In the above embodiments, the first, second and third lens are made of plastic material. However, it has the same effect and falls into the scope of the invention that a part or all of the first, second and third lens are made of glass material.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A miniaturized lens assembly comprising a first lens, a second lens and a third lens, all of which are arranged in sequence from an object side to an image side along an optical axis, wherein:

the first lens is a convex-concave lens with negative refractive power and comprises a convex surface facing the object side and a concave surface facing the image side;

the second lens is with positive refractive power;

the third lens is a convex-concave lens with negative refractive power and comprises a convex surface facing the object side and a concave surface facing the image side; and the miniaturized lens assembly satisfies:

$$0.35 \leq BFL/TTL \leq 0.38$$

wherein BFL is a back focal length of the miniaturized lens assembly and TTL is a distance from the convex surface of the first lens to an image plane along the optical axis.

2. The miniaturized lens assembly as claimed in claim 1, wherein the first lens satisfies:

$$-4.5 \leq f_1/f \leq -3.3$$

wherein $f_1$ is an effective focal length of the first lens and f is an effective focal length of the miniaturized lens assembly.

3. The miniaturized lens assembly as claimed in claim 1, wherein the second lens satisfies:

$$0.5 \leq f_2/f \leq 0.55$$

wherein $f_2$ is an effective focal length of the second lens and f is an effective focal length of the miniaturized lens assembly.

4. A miniaturized lens assembly comprising a first lens, a second lens and a third lens, all of which are arranged in sequence from an object side to an image side along an optical axis, wherein:

the first lens is a convex-concave lens with negative refractive power and comprises a convex surface facing the object side and a concave surface facing the image side;

the second lens is with positive refractive power;

the third lens is a convex-concave lens with negative refractive power and comprises a convex surface facing the object side and a concave surface facing the image side; and the third lens satisfies:

$$-0.9 \leq f_3/f \leq -0.8$$

wherein $f_3$ is an effective focal length of the third lens and f is an effective focal length of the miniaturized lens assembly.

5. A miniaturized lens assembly comprising a first lens, a second lens and a third lens, all of which are arranged in sequence from an object side to an image side along an optical axis, wherein:

the first lens is a convex-concave lens with negative refractive power and comprises a convex surface facing the object side and a concave surface facing the image side;

the second lens is with positive refractive power;

the third lens is a convex-concave lens with negative refractive power and comprises a convex surface facing the object side and a concave surface facing the image side; and the first lens and the third lens satisfy:

$$3.75 \leq f_1/f_3 \leq 5.5$$

wherein $f_1$ is an effective focal length of the first lens and $f_3$ is an effective focal length of the third lens.

6. The miniaturized lens assembly as claimed in claim 1, wherein the convex surface of the first lens is an aspheric surface, or the concave surface of the first lens is an aspheric surface, or both of the convex surface and the concave surface of the first lens are aspheric surfaces.

7. The miniaturized lens assembly as claimed in claim 1, wherein the second lens comprises two surfaces, at least one of which is an aspheric surface or both of which are aspheric surfaces.

8. The miniaturized lens assembly as claimed in claim 1, wherein the convex surface of the third lens is an aspheric surface, or the concave surface of the third lens is an aspheric surface, or both of the convex surface and the concave surface of the third lens are aspheric surfaces.

9. The miniaturized lens assembly as claimed in claim 1, wherein the first lens, the second lens and the third lens are made of plastic material.

10. The miniaturized lens assembly as claimed in claim 1, further comprising a stop disposed between the first lens and the second lens.

\* \* \* \* \*